(12) United States Patent
Slane et al.

(10) Patent No.: US 11,939,105 B2
(45) Date of Patent: Mar. 26, 2024

(54) 3D WOVEN CONFORMABLE TANK

(71) Applicant: Goodrich Corporation, Charlotte, NC (US)

(72) Inventors: Casey Slane, Richwood, OH (US); Jin Hu, Hudson, OH (US); Nathaniel Ching, Hartville, OH (US)

(73) Assignee: Goodrich Corporation, Charlotte, NC (US)

( * ) Notice: Subject to any disclaimer, the term of this patent is extended or adjusted under 35 U.S.C. 154(b) by 859 days.

(21) Appl. No.: 15/689,585

(22) Filed: Aug. 29, 2017

(65) Prior Publication Data

US 2019/0061986 A1 Feb. 28, 2019

(51) Int. Cl.
| | | |
|---|---|---|
| *F17C 1/08* | (2006.01) | |
| *B64D 11/02* | (2006.01) | |
| *B64D 11/04* | (2006.01) | |
| *B64D 37/04* | (2006.01) | |
| *B64D 37/06* | (2006.01) | |
| *B65D 1/40* | (2006.01) | |
| *B65D 88/02* | (2006.01) | |
| *B65D 90/02* | (2019.01) | |
| *F17C 1/06* | (2006.01) | |
| *F17C 1/16* | (2006.01) | |

(52) U.S. Cl.
CPC .............. *B65D 1/40* (2013.01); *B64D 11/02* (2013.01); *B64D 11/04* (2013.01); *B64D 37/04* (2013.01); *B64D 37/06* (2013.01); *B65D 88/02* (2013.01); *B65D 90/02* (2013.01); *F17C 1/06* (2013.01); *F17C 1/16* (2013.01)

(58) Field of Classification Search
CPC ..... B64D 11/0007; B64D 11/04; B64D 11/02; B64C 3/34; F17C 2270/0189; F17C 2203/0658; F17C 2203/066; F17C 2203/0663; F17C 2203/0665; F17C 2203/0668; F17C 2203/067; F17C 2203/0673
USPC ......................................... 220/592, 563, 564
See application file for complete search history.

(56) References Cited

U.S. PATENT DOCUMENTS

| | | | |
|---|---|---|---|
| 1,640,471 | A | 8/1927 | Staley |
| 2,461,096 | A | 2/1949 | Wagner |
| 2,516,100 | A | 7/1950 | Boardman |
| 2,533,431 | A | 12/1950 | Chausson |

(Continued)

FOREIGN PATENT DOCUMENTS

| | | |
|---|---|---|
| CN | 103538817 A | 1/2014 |
| DE | 3206430 A1 | 9/1983 |

(Continued)

OTHER PUBLICATIONS

Extended European Search Report for European Patent Application No. 18190532.4, dated Jan. 25, 2019, 7 pages.

(Continued)

*Primary Examiner* — Allan D Stevens
(74) *Attorney, Agent, or Firm* — Kinney & Lange, P.A.

(57) ABSTRACT

A conformable tank includes a body with a plurality of walls defining a cavity in the body, and an internal support structure connected to an internal surface of one of the plurality of walls and protruding into the cavity of the body. The plurality of walls are formed of a first 3D woven composite material. The internal support structure is formed of a second composite material.

6 Claims, 12 Drawing Sheets

(56) References Cited

U.S. PATENT DOCUMENTS

| | | | |
|---|---|---|---|
| 2,552,119 A | 5/1951 | Scharenberg | |
| 2,634,019 A | 4/1953 | Pfaff | |
| 2,672,254 A | 3/1954 | Boardman | |
| 2,947,439 A | 8/1960 | McGrath | |
| 3,288,186 A | 11/1966 | Headrick | |
| 3,314,567 A | 4/1967 | Becker et al. | |
| 3,447,768 A | 6/1969 | McQueen | |
| 3,931,907 A | 1/1976 | Henle | |
| 4,287,913 A | 9/1981 | Bennett et al. | |
| 4,432,515 A * | 2/1984 | Jarvineva | B64D 37/06 244/123.5 |
| 4,858,778 A | 8/1989 | Patrick | |
| 4,941,583 A | 7/1990 | Gerhard | |
| 4,946,056 A | 8/1990 | Stannard | |
| 5,042,751 A | 8/1991 | Kolom | |
| 5,071,166 A | 12/1991 | Marino | |
| 5,083,727 A | 1/1992 | Pompei et al. | |
| 5,085,343 A | 2/1992 | Scarr | |
| 5,103,996 A | 4/1992 | McGarvey | |
| 5,303,739 A | 4/1994 | Ellgoth et al. | |
| 5,310,080 A | 5/1994 | Figge, Sr. | |
| 5,367,879 A | 11/1994 | Doke et al. | |
| 5,383,566 A | 1/1995 | Johnson | |
| 5,389,839 A | 3/1995 | Kleyn | |
| 5,476,189 A | 12/1995 | Duvall et al. | |
| 5,620,111 A | 4/1997 | Gehman | |
| 5,647,503 A | 7/1997 | Steele et al. | |
| 5,651,474 A | 7/1997 | Callaghan et al. | |
| 5,697,511 A | 12/1997 | Bampton | |
| 5,758,796 A | 6/1998 | Nishimura et al. | |
| 5,779,092 A | 7/1998 | Hehn et al. | |
| 5,845,879 A | 12/1998 | Jensen | |
| 5,848,720 A | 12/1998 | Logan | |
| 5,927,651 A | 7/1999 | Geders et al. | |
| 5,936,861 A | 8/1999 | Jang et al. | |
| 5,944,215 A | 8/1999 | Orlowski | |
| 6,044,999 A | 4/2000 | Kido | |
| 6,090,465 A | 7/2000 | Steele et al. | |
| 6,422,514 B1 | 7/2002 | Clark et al. | |
| 6,668,561 B1 | 12/2003 | Sheu et al. | |
| 6,691,889 B1 | 2/2004 | Falk | |
| 6,837,464 B1 | 1/2005 | Kim et al. | |
| 7,195,133 B1 | 3/2007 | Cundiff et al. | |
| 7,396,459 B2 | 7/2008 | Thorpe | |
| 7,803,241 B2 | 9/2010 | Cundiff et al. | |
| 7,810,670 B2 | 10/2010 | Carter et al. | |
| 8,192,666 B2 | 6/2012 | Strack et al. | |
| 8,235,242 B2 | 8/2012 | Ha | |
| 8,794,476 B2 | 8/2014 | Hausberger et al. | |
| 8,917,809 B2 | 12/2014 | Nozawa | |
| 8,939,407 B2 | 1/2015 | Robinson et al. | |
| 9,126,365 B1 | 9/2015 | Mark et al. | |
| 9,243,751 B2 | 1/2016 | Clark et al. | |
| 9,458,955 B2 | 10/2016 | Hammer et al. | |
| 9,470,366 B2 | 10/2016 | Dullaert et al. | |
| 9,476,546 B2 | 10/2016 | Croteau et al. | |
| 9,523,466 B2 | 12/2016 | Nishimoto et al. | |
| 10,081,129 B1 | 9/2018 | Alvarado et al. | |
| 10,099,427 B2 | 10/2018 | Mark et al. | |
| 2002/0179610 A1 | 12/2002 | Franklin, III et al. | |
| 2003/0044593 A1 | 3/2003 | Vaidyanathan et al. | |
| 2004/0159663 A1 | 8/2004 | Fenton | |
| 2004/0173618 A1 | 9/2004 | Suzuki et al. | |
| 2004/0178205 A1 | 9/2004 | Balzer et al. | |
| 2005/0129889 A1 | 6/2005 | Davis et al. | |
| 2007/0158343 A1 | 7/2007 | Shimada et al. | |
| 2007/0289451 A1 | 12/2007 | Rice | |
| 2008/0110900 A1 | 5/2008 | Veenendaal | |
| 2009/0174709 A1 | 7/2009 | Kozlak et al. | |
| 2009/0212161 A1 * | 8/2009 | MacKulin | B64C 1/1453 244/129.1 |
| 2009/0314785 A1 * | 12/2009 | Cronin | B29C 53/602 220/590 |
| 2010/0084030 A1 | 4/2010 | Mackulin et al. | |
| 2010/0105269 A1 * | 4/2010 | Goering | B29D 99/0003 442/205 |
| 2010/0116778 A1 | 5/2010 | Melrose | |
| 2011/0168728 A1 | 7/2011 | McDermott et al. | |
| 2012/0027612 A1 * | 2/2012 | Yarbrough | F03D 1/065 416/226 |
| 2012/0217249 A1 | 8/2012 | Baika et al. | |
| 2013/0048646 A1 | 2/2013 | Kataoka et al. | |
| 2013/0213973 A1 | 8/2013 | Esser | |
| 2014/0291331 A1 | 10/2014 | Morales et al. | |
| 2014/0328964 A1 | 11/2014 | Mark et al. | |
| 2015/0258740 A1 | 9/2015 | Kang et al. | |
| 2016/0061381 A1 | 3/2016 | Kotliar | |
| 2016/0068235 A1 | 3/2016 | Ohtsuka et al. | |
| 2016/0070254 A1 | 3/2016 | Hovsepian et al. | |
| 2016/0161057 A1 * | 6/2016 | Kang | B29C 70/086 220/581 |
| 2016/0238193 A1 | 8/2016 | Meyer | |
| 2016/0257403 A1 | 9/2016 | Masuda | |
| 2016/0263832 A1 | 9/2016 | Bui et al. | |
| 2016/0272413 A1 | 9/2016 | Masuda | |
| 2016/0281926 A1 | 9/2016 | Croteau et al. | |
| 2016/0290564 A1 | 10/2016 | Croteau et al. | |
| 2016/0341359 A1 | 11/2016 | Nishibu | |
| 2016/0361869 A1 | 12/2016 | Mark et al. | |
| 2017/0268206 A1 | 9/2017 | Giamati | |
| 2017/0299119 A1 * | 10/2017 | Zhao | B29C 63/04 |
| 2018/0126667 A1 | 5/2018 | Wilenski et al. | |
| 2019/0061947 A1 | 2/2019 | Slane et al. | |
| 2019/0061948 A1 | 2/2019 | Ching et al. | |

FOREIGN PATENT DOCUMENTS

| | | |
|---|---|---|
| DE | 102007018549 A1 | 10/2008 |
| DE | 102011101471 A1 | 11/2012 |
| EP | 1409917 B1 | 6/2006 |
| EP | 2392395 A1 | 12/2011 |
| EP | 2942285 A1 | 11/2015 |
| EP | 3015721 A1 | 5/2016 |
| EP | 3061709 A1 | 8/2016 |
| EP | 3073174 A1 | 9/2016 |
| EP | 3450316 B1 | 4/2022 |
| FR | 2218529 A1 | 9/1974 |
| GB | 1426414 | 2/1976 |
| JP | 2005155776 A | 6/2005 |
| KR | 20100113865 A | 10/2010 |
| WO | WO2016057024 A1 | 4/2016 |
| WO | WO2017091222 A1 | 6/2017 |

OTHER PUBLICATIONS

Extended European Search Report for European Patent Application No. 18190579.5, dated Jan. 29, 2019, 10 pages.
Extended European Search Report for European Patent Application No. 18191294.0, dated Jan. 31, 2019, 5 pages.
Extended European Search Report for European Patent Application No. 18193814.3, dated Feb. 12, 2019, 8 bages.
Extended European Search Report for European Patent Application No. 18194813.4 dated Mar. 8, 2019, 12 pages.
European Office Action dated Nov. 8, 2019, received for corresponding European Application No. 18190532.4, 4 pages.
Extended European Search Report for European Patent Application No. 18194813.4, dated Jun. 26, 2019, 11 pages.
European Office Action dated Mar. 13, 2020, received for corresponding European Application No. 18190579.5, 4 pages.
Office Action from Brazilian Application No. BR 10 2018 01618 5, dated Sep. 7, 2022, pp. 6.

* cited by examiner

3D WOVEN CONFORMABLE TANK

BACKGROUND

The present invention relates generally to pressurized tanks, and more particularly to pressurized tanks used on an aircraft for potable water.

The aircraft industry currently employs pressurized tanks constructed of dense metal alloys to transport and make use of potable water on board an aircraft. Potable water on an aircraft may be used for direct human consumption, food preparation, hygienic activities, and sanitation. For example, water may be used for the preparation of hot and cold beverages for consumption, reconstituting dehydrated foods, ingestion from cold water taps or water fountains, brushing of teeth, hand washing, cleaning of utensils, lavatory use, and onboard showering facilities.

In general, any tank for use in an aircraft is subjected to pressure, vibration, flight loads, and shock stresses. The pressure, in particular, can create large bending stresses on flat walls of the tanks. Metal tanks have internal bracing to support various sections and joints that are under such stresses, especially those portions with flat walls and sharp corners. However, metal tanks are relatively heavy. The higher the total weight of an aircraft the more fuel that is required to fly. Thus, it is desirable to find a lightweight conformable tank which can withstand the pressure, vibration, flight loads, and shock stresses encountered on board an aircraft to improve its fuel efficiency.

SUMMARY

A conformable tank includes a body with a plurality of walls defining a cavity in the body, and an internal support structure connected to an internal surface of one of the plurality of walls and protruding into the cavity of the body. The plurality of walls are formed of a first 3D woven composite material. The internal support structure is formed of a second composite material.

A potable water system for an aircraft includes a conformable tank positioned adjacent to a fuselage of the aircraft that is configured to hold potable water, a fluid flow inducer connected to the conformable tank the is configured to pump water through the potable water system, and a control valve connected to the fluid flow inducer and the conformable tank that is configured to control the flow of water. The conformable tank includes a body with a plurality of walls defining a cavity in the body, and an internal support structure connected to an internal surface of one of the plurality of walls and protruding into the cavity of the body. The plurality of walls are formed of a first 3D woven composite material. The internal support structure is formed of a second composite material.

DETAILED DESCRIPTION

Figure 1A:
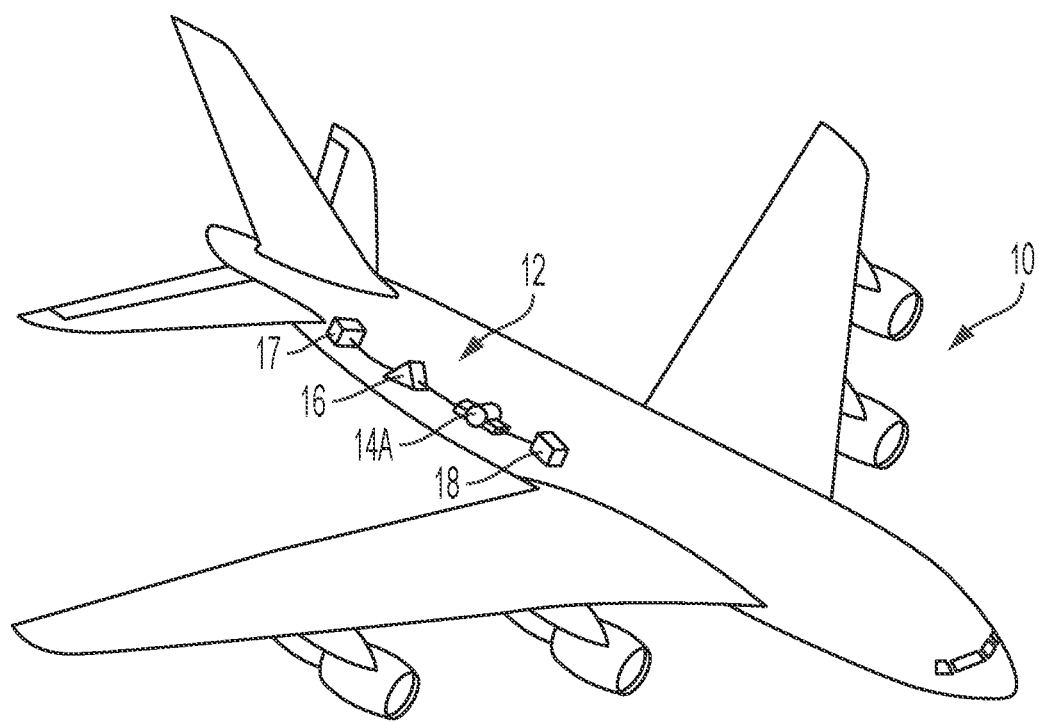
FIG. 1A is a schematic of an aircraft with a first embodiment of a potable water system.
Figure 1B:
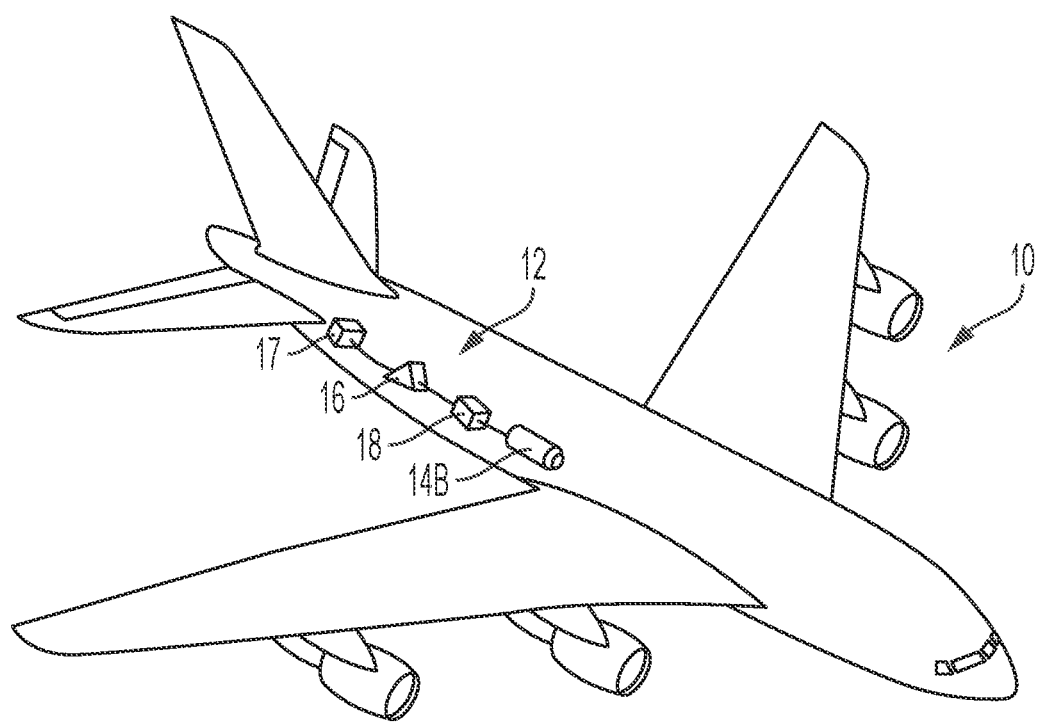
FIG. 1B is a schematic of an aircraft with a second embodiment of a potable water system.
Figure 1C:
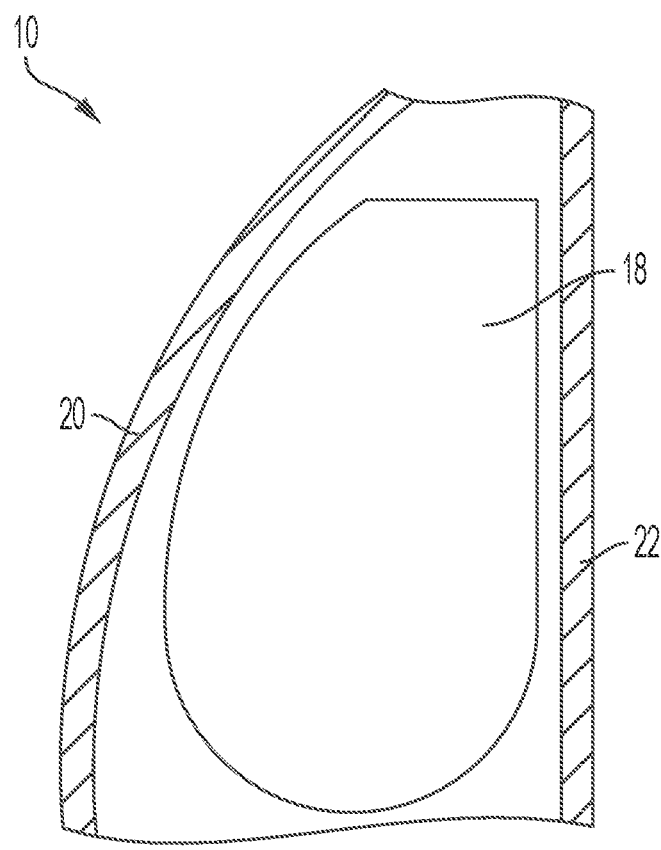
FIG. 1C is a cross-sectional view of an aircraft fuselage, showing a conformable tank.

FIG. 1A is a schematic of aircraft 10 with a first embodiment of potable water system 12, which includes hydraulic pump 14A, control valve 16, point of use 17, and conformable tank 18. FIG. 1B is a schematic of aircraft 10 with a second embodiment of potable water system 12, which includes compressed air source 14B, control valve 16, point of use 17, and conformable tank 18. FIG. 1C is a cross-sectional view of aircraft 10, showing conformable tank 18, fuselage 20, and internal structure 22.

Situated in an aft portion of aircraft 10 is potable water system 12. In the first embodiment shown in FIG. 1A, potable water system 12 includes hydraulic pump 14A, control valve 16, point of use 17, and conformable tank 18 that are connected to one another by hydraulic tubes, lines, or hoses. Fluid flow within potable water system 12 is induced using hydraulic pump 14A. Fluid flow within potable water system 12 is controlled using control valve 16. Potable water for use in potable water system 12 is stored in conformable tank 18. In the embodiment shown in FIG. 1B, potable water system 12 includes compressed air source 14B, control valve 16, point of use 17, and conformable tank 18 that are connected to one another by hydraulic tubes, lines, or hoses. Fluid flow within potable water system 12 is induced by compressed air source 14B. Fluid flow within potable water system 12 is controlled using control valve 16. Potable water for use in potable water system 12 is stored in conformable tank 18 at an elevated pressure, as compared to ambient pressure outside conformable tank 18.

As shown in FIG. 1C, conformable tank 18 is configured to conform to both fuselage 20 and internal structure 22. A curved wall on a first side of conformable tank 18 is configured to conform to the curvature of fuselage 20. Likewise, a flat wall on a second side of conformable tank 18 opposite of the curved wall is configured to conform to internal structure 22. FIG. 1C shows one embodiment of conformable tank 18 and is not meant to limit the disclosure to a single embodiment. Conformable tank 18 is conformable for use in a plurality of irregular aircraft spaces. The following description details two possible embodiments of conformable tank 18.

Figure 2:
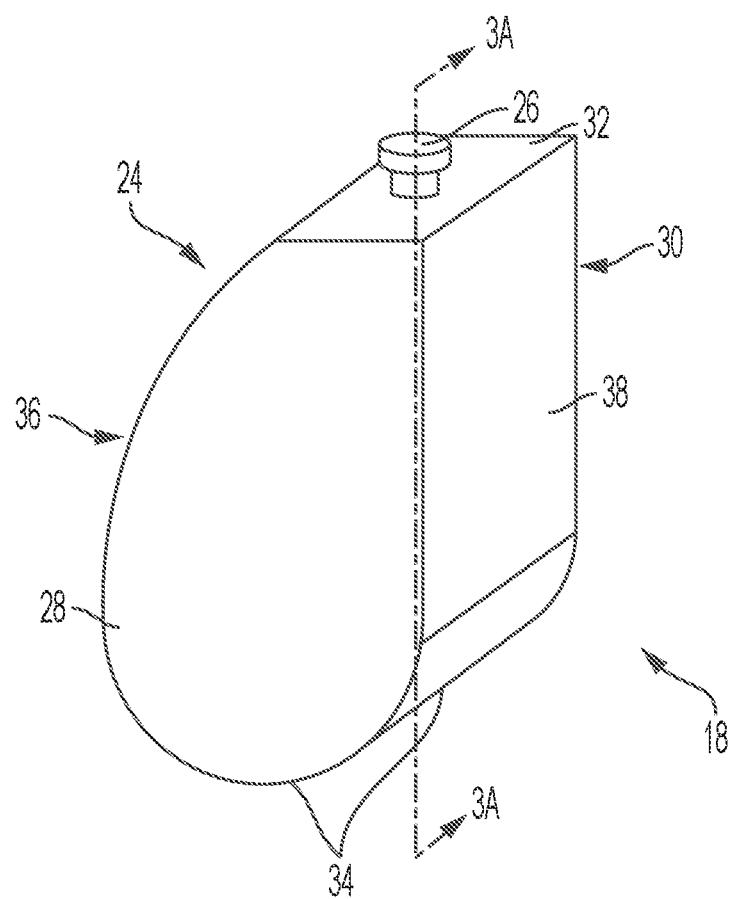
FIG. 2 is a perspective view of the conformable tank of FIG. 1B.

FIG. 2 is a perspective view of conformable tank 18. Conformable tank 18 includes body 24 and port 26. Body 24 includes front wall 28, rear wall 30, top wall 32, bottom wall 34, curved side wall 36, and flat side wall 38. In the embodiment shown in FIG. 2, front wall 28, rear wall 30, and top wall 32 are shown as flat walls and bottom wall 34 is shown as a curved wall. In alternate embodiments, front wall 28, rear wall 30, top wall 32 and bottom wall 34 can be flat walls, curved walls, or irregular shaped walls.

Conformable tank 18 is made out of a continuous fiber filament reinforced composite that is produced using a fused deposition modeling process in the embodiment shown in FIG. 2. In alternate embodiments, conformable tank 18 can be manufactured out of any suitable material using any suitable process. Conformable tank 18 includes body 24 that forms a housing for conformable tank 18. A fluid can be stored in body 24 of conformable tank 18. Port 26 extends through body 24 of conformable tank 18. Port 26 is an inlet/outlet for conformable tank 18 that allows a fluid to flow into and out of conformable tank 18. As conformable tank 18 is a pressurized tank, port 26 is used to allow the fluid to flow into and out of conformable tank 18 while maintaining the pressure in conformable tank 18. In alternate embodiments, other mechanisms can be used to allow the fluid to flow into and out of conformable tank 18.

Body 24 of conformable tank 18 includes front wall 28 that is positioned opposite of rear wall 30, top wall 32 that is positioned opposite of bottom wall 34, and curved side wall 36 that is positioned opposite of flat side wall 38. Front wall 28 is in contact with and connects to top wall 32, bottom wall 34, curved side wall 36, and flat side wall 38. Rear wall 30 is in contact with and connects to top wall 32, bottom wall 34, curved side wall 36, and flat side wall 38. Top wall 32 extends between and connects to front wall 28, rear wall 30, curved side wall 36, and flat side wall 38. Bottom wall 34 extends between and connects to front wall 28, rear wall 30, curved side wall 36, and flat side wall 38. Curved side wall 36 is in contact with and connects to front wall 28, rear wall 30, top wall 32, and bottom wall 34. Flat side wall 38 is in contact with and connects to front wall 28, rear wall 30, top wall 32, and bottom wall 34.

In the embodiment shown in FIG. 2, port 26 is situated on top wall 32. In alternate embodiments, port 26 can be situated on any of the walls of body 24, such as front wall 28, rear wall 30, top wall 32, bottom wall 34, curved side wall 36, or flat side wall 38. Further, in the embodiment shown in FIG. 2 there is only one port 26. In alternate embodiments, there can be a plurality of port 26, extending through the same wall or different walls of body 24. Port 26 is configured to aid in filling and emptying conformable tank 18. In the embodiment shown in FIG. 2, conformable tank 18 is designed to store potable water for use on aircraft 10 as a part of potable water system 12 (shown in FIG. 1A). Port 26 of conformable tank 18 can be connected by a tube to hydraulic pump 14A of potable water system 12, as shown in FIG. 1A. Likewise, port 26 of conformable tank 18 can be connected by a tube to compressed air source 14B and control valve 16 of potable water system 12, as shown in FIG. 1B.

Figure 3A:
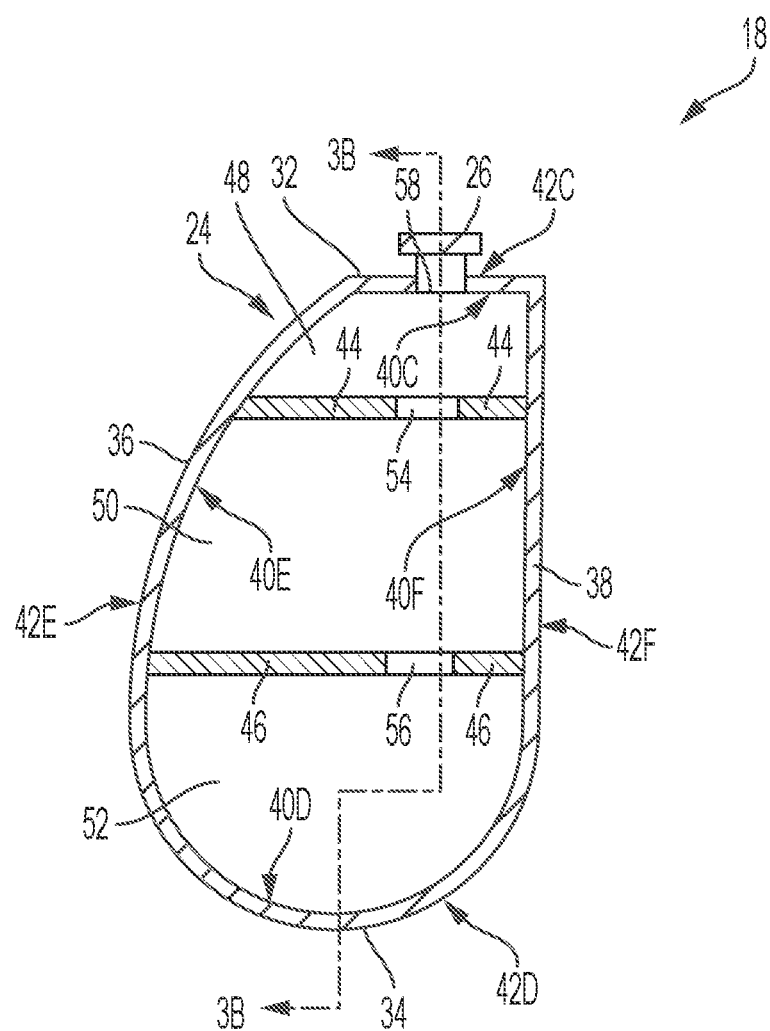
FIG. 3A is a side cross-sectional view of a first embodiment of the conformable tank taken along line A-A of FIG. 2.
Figure 3B:
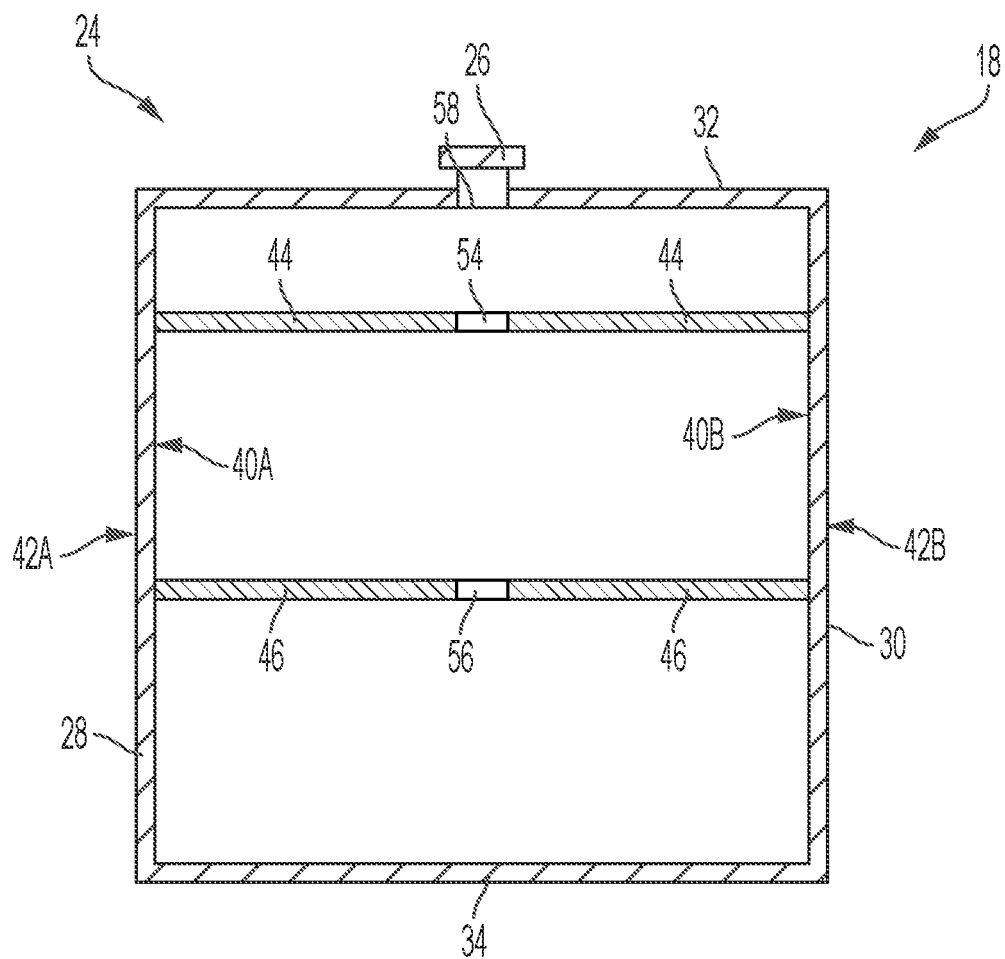
FIG. 3B is a side cross-section view of the first embodiment of the conformable tank taken along line 3B-3B of FIG. 3A.

FIG. 3A is a side cross-sectional view of a first embodiment of conformable tank 18 taken along line A-A of FIG. 2. FIG. 3B is a side cross-section view of the first embodiment of conformable tank 18 taken along line 3B-3B of FIG. 3A. Conformable tank 18 includes body 24 and port 26. Body 24 includes front wall 28, rear wall 30, top wall 32, bottom wall 34, curved side wall 36, and flat side wall 38. Front wall 28, rear wall 30, top wall 32, bottom wall 34, curved side wall 36, and flat side wall 38 include inner surfaces 40A, 40B, 40C, 40D, 40E, and 40F, and outer surfaces 42A, 42B, 42C, 42D, 42E, and 42F, respectively. Conformable tank 18 further includes first baffle 44, second baffle 46, first cavity 48, second cavity 50, third cavity 52, first aperture 54, second aperture 56, and third aperture 58.

Conformable tank 18 includes body 24 that forms a housing of conformable tank 18. Port 26 extends through body 24 of conformable tank 18 to provide an inlet/outlet to conformable tank 18. Body 24 of conformable tank 18 includes front wall 28 that is positioned opposite of rear wall 30, top wall 32 that is positioned opposite of bottom wall 34, and curved side wall 36 that is positioned opposite of flat side wall 38.

Front wall 28 includes inner surface 40A and outer surface 42A. Rear wall 30 includes inner surface 40B and outer surface 42B. Top wall 32 includes inner surface 40C and outer surface 42C. Bottom wall 34 includes inner surface 40D and outer surface 42D. Curved side wall 36 includes inner surface 40E and outer surface 42E. Flat side wall 38 includes inner surface 40F and outer surface 42F. Inner surfaces 40A, 40B, 40C, 40D, 40E, and 40F form an interior of conformable tank 18 and outer surfaces 42A, 42B, 42C, 42D, 42E, and 42F form an exterior of conformable tank 18.

Conformable tank 18 further includes first baffle 44 and second baffle 46 extending through an interior of conformable tank 18. First baffle 44 extends from inner surface 40E of curved side wall 36 to inner surface 40F of flat side wall 38. First baffle 44 also extends from inner surface 40A of front wall 28 to inner surface 40B of rear wall 30. Second baffle 46 extends from inner surface 40E of curved side wall 36 to inner surface 40F of flat side wall 38. Second baffle 46 also extends from inner surface 40A of front wall 28 to inner surface 40B of rear wall 30.

First baffle 44 and second baffle 46 are configured to act as internal supports and provide structural support to body 24 of conformable tank 18. Without first baffle 44 and second baffle 46, conformable tank 18 could deform under internal pressure. In the embodiment shown, conformable tank 18 includes two baffles. In alternate embodiments, conformable tank 18 can include any number of baffles.

First baffle 44 and second baffle 46 divide the interior of conformable tank 18 into first cavity 48, second cavity 50, and third cavity 52. First cavity 48 is defined as the volume enclosed by front wall 28, rear wall 30, top wall 32, curved side wall 36, flat side wall 38, and first baffle 44. Second cavity 50 is defined as the volume enclosed by front wall 28, rear wall 30, curved side wall 36, flat side wall 38, first baffle 44, and second baffle 46. Third cavity 52 is defined as the volume enclosed by front wall 28, rear wall 30, bottom wall 34, curved side wall 36, and flat side wall 38, and second baffle 46. First cavity 48, second cavity 50, and third cavity 52 are configured to store potable water, or any other fluid, at an elevated pressure in conformable tank 18.

Extending through first baffle 44 and fluidly connecting first cavity 48 and second cavity 50 is first aperture 54. Extending through second baffle 46 and fluidly connecting second cavity 50 and third cavity 52 is second aperture 56. The embodiment shown in FIGS. 3A-3B shows a single aperture extending through each baffle. Alternate embodiments may include any number of apertures extending through each baffle. Further, the apertures can be of equal shape and size or varying shape and size.

Extending through top wall 32 is third aperture 58. Third aperture 58 provides a means for filling and emptying conformable tank 18. Third aperture 58 can be fitted with port 26 or any other component used to aid in filling and emptying conformable tank 18. According to the embodiment shown in FIGS. 3A-3B, third aperture 58 extends through top wall 32. In alternate embodiments, third aperture 58 can extend through any of the walls of body 24, such as front wall 28, rear wall 30, top wall 32, bottom wall 34, curved side wall 36, or flat side wall 38.

Conformable tank 18 is configured to store fluids, particularly potable water, at an elevated pressure when compared to ambient pressure outside conformable tank 18. The baffles within conformable tank 18 provide structural support to prevent excessive deformation from the internal pressure while still allowing fluid to pass from cavity to cavity. Conformable tank 18 can be designed to fit in and conform to a plurality of irregular aircraft spaces.

Figure 4A:
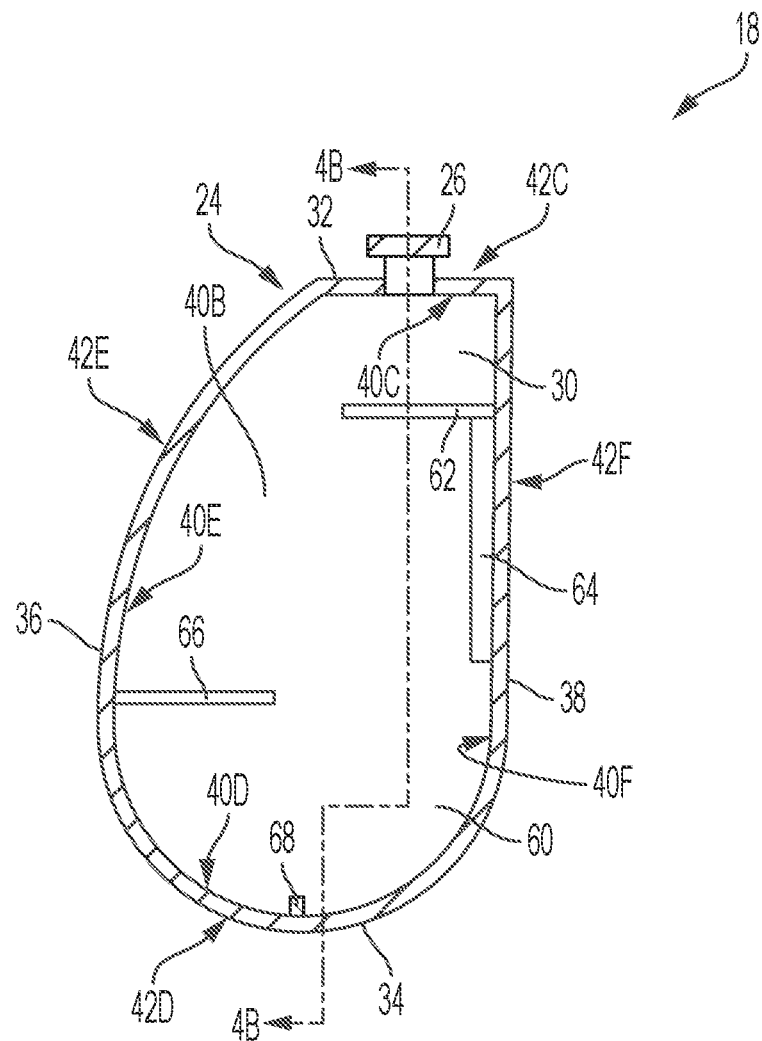
FIG. 4A is a side cross-sectional view of a second embodiment of the conformable tank taken along line A-A of FIG. 2.
Figure 4B:
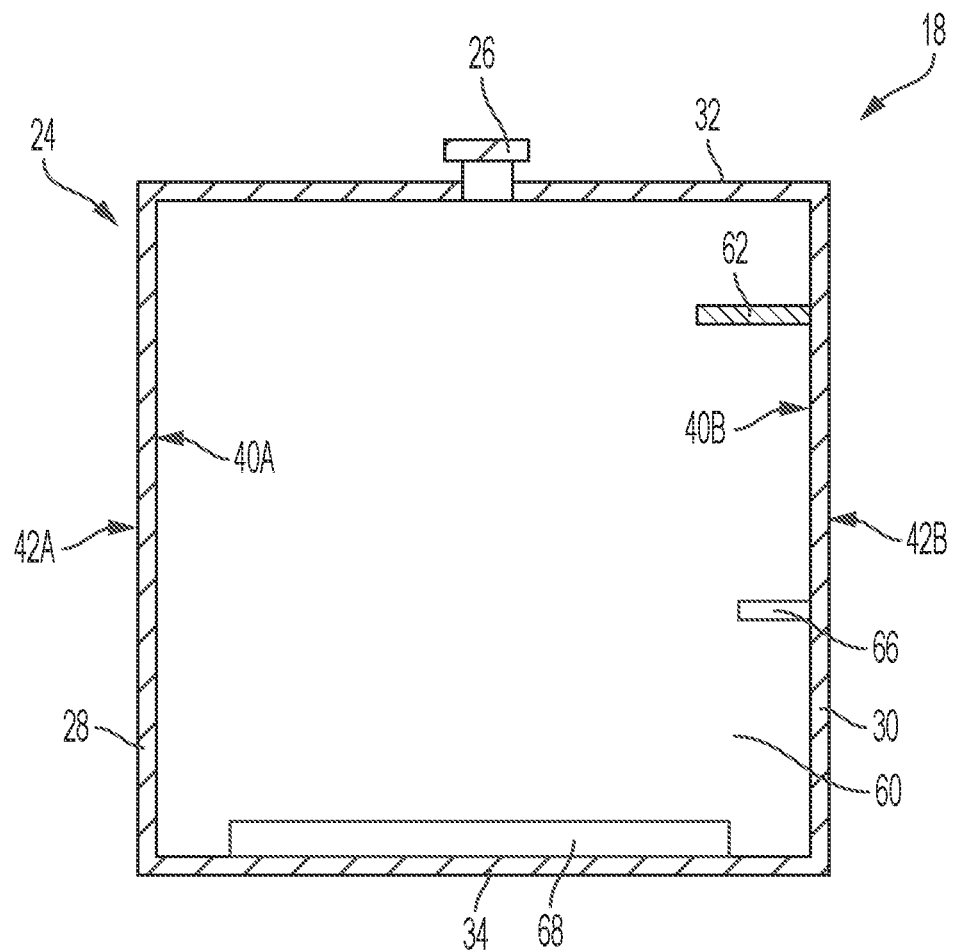
FIG. 4B is a side cross-sectional view of the second embodiment of the conformable tank taken along line 4B-4B of FIG. 4A.

FIG. 4A is a side cross-sectional view of a second embodiment of conformable tank 18 taken along line A-A of FIG. 2. FIG. 4B is a side cross-sectional view of the second embodiment of conformable tank 18 taken along line 4B-4B of FIG. 4A. Conformable tank 18 includes body 24 and port 26. Body 24 includes front wall 28, rear wall 30, top wall 32, bottom wall 34, curved side wall 36, and flat side wall 38. Front wall 28, rear wall 30, top wall 32, bottom wall 34, curved side wall 36, and flat side wall 38 include inner surfaces 40A, 40B, 40C, 40D, 40E, and 40F, and outer surfaces 42A, 42B, 42C, 42D, 42E, and 42F, respectively. Conformable tank 18 further includes internal cavity 60, first rib 62, second rib 64, third rib 66, and fourth rib 68.

Conformable tank 18 includes body 24 that forms a housing of conformable tank 18. Port 26 extends through body 24 of conformable tank 18 to provide an inlet/outlet to conformable tank 18. Body 24 of conformable tank 18 includes front wall 28 that is positioned opposite of rear wall 30, top wall 32 that is positioned opposite of bottom wall 34, and curved side wall 36 that is positioned opposite of flat side wall 38.

Front wall 28 includes inner surface 40A and outer surface 42A. Rear wall 30 includes inner surface 40B and outer surface 42B. Top wall 32 includes inner surface 40C and outer surface 42C. Bottom wall 34 includes inner surface 40D and outer surface 42D. Curved side wall 36 includes inner surface 40E and outer surface 42E. Flat side wall 38 includes inner surface 40F and outer surface 42F. Inner surfaces 40A, 40B, 40C, 40D, 40E, and 40F form an interior of conformable tank 18 and outer surfaces 42A, 42B, 42C, 42D, 42E, and 42F form an exterior of conformable tank 18. Internal cavity 60 is formed in the interior of conformable tank 18.

Conformable tank 18 includes first rib 62, second rib 64, third rib 66, and fourth rib 68 in cavity 60 to provide structural support for conformable tank 18. First rib 62 extends along inner surface 40B of rear wall 30 and abuts inner surface 40F of flat side wall 38 and protrudes into internal cavity 60. Second rib 64 extends along inner surface 40F of flat side wall 38 and protrudes into internal cavity 60. Third rib 66 extends along inner surface 40B of rear wall 30 and protrudes into internal cavity 60. Fourth rib 68 extends from inner surface 40D of bottom wall 34 and protrudes into internal cavity 60.

The embodiment shown in FIGS. 4A-4B is one embodiment of conformable tank 18 with ribs utilized as internal supports. The ribs provide structural support to conformable tank 18 and prevent it from deforming excessively under internal pressure. This embodiment is not meant to limit the disclosure to a single embodiment. In alternate embodiments, conformable tank 18 can include a plurality of ribs of varying shapes and sizes. The ribs can connect to any of the walls of body 24 and extend along or protrude from the walls in any suitable manner.

Conformable tank 18 is configured to store fluids, particularly potable water, at an elevated pressure when compared to ambient pressure outside conformable tank 18. The ribs within conformable tank 18 provide structural support to prevent excessive deformation from the internal pressure while still allowing fluid flow within the internal cavity. Conformable tank 18 can be designed to fit in and conform to a plurality of irregular aircraft spaces.

Figure 5:
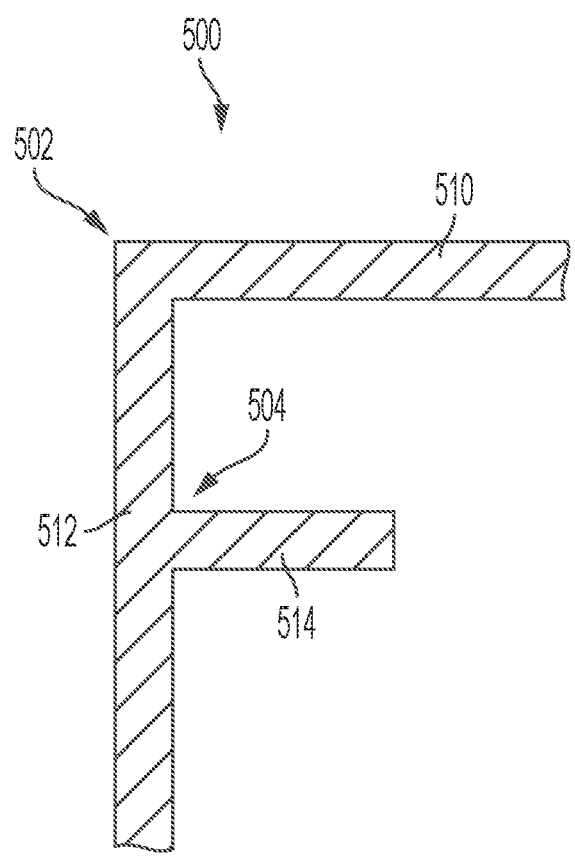
FIG. 5 is a cross-sectional view of a portion of a tank.

FIG. 5 is a cross-sectional view of a portion tank 500, which is one embodiment of conformable tank 18 shown in FIGS. 1A-4B. Tank 500 includes corner 502, joint 504, first wall 510, second wall 512, and rib 514.

Corner 502 and joint 504 are created as a part of tank 500 with 3D weaving. Corner 502 is formed at an intersection of first wall 510 and second wall 512. First wall 510 and second wall 512 are integrally woven together with 3D weaving, forming corner 502. Individual fibers in the composite material run continuously through both first wall 510 and second wall 512, which obviates the need for additional bonding or fastening. Joint 504 is formed at an intersection of second wall 512 and rib 514.

Rib 514 is integrally woven into second wall 512 with 3D weaving. Individual fibers in the composite material run continuously through both rib 514 and second wall 512. This obviates the need for any additional bonding or fastening of rib 514 to second wall 512.

3D weaving is a textile process that may be used to fabricate 3D composite structures. 3D weaving is a manufacturing technique for producing near net shape fiber preforms. 3D weaving can be used to create 3D fiber preforms with interlocking fibers. A resin is applied to the 3D fiber preforms to create a 3D composite structure. 3D weaving provides quasi-isotropic properties, which enhances the composites stress tolerance in the out-of-plane direction. The touch labor required to assemble the preforms is minimal. This leads to rapid and highly automated preform construction.

Geometric features, such as changes in thickness, integral stiffeners, or bifurcations, can be woven directly into the preform, resulting in near net shape articles that are ready for molding with minimal trimming or hand work. Preform geometries can vary from simple cross sectional shapes, such as Pi's or H's, to extremely complicated shapes, such as the airfoil geometries used in jet engine fan blades. 3D weaving results in a construction which is lighter than its metal counterpart with increased strength and shape over other composite materials.

3D weaving can be used to create conformable tank 500. Corner 502 and joint 504 are formed with 3D weaving. Suitable 3D weaving methods for constructing conformal tank 500 include, for example, contour weaving, steered weaving, and through thickness weaving or sewing. The woven material may be, for example, formed of fiberglass, carbonaceous materials, aramid or other synthetic fibers, and combinations thereof. Using 3D weaving to manufacture conformable tank 500 creates conformable tank 500 that is suitable for transporting potable water in an aircraft.

Figure 6:
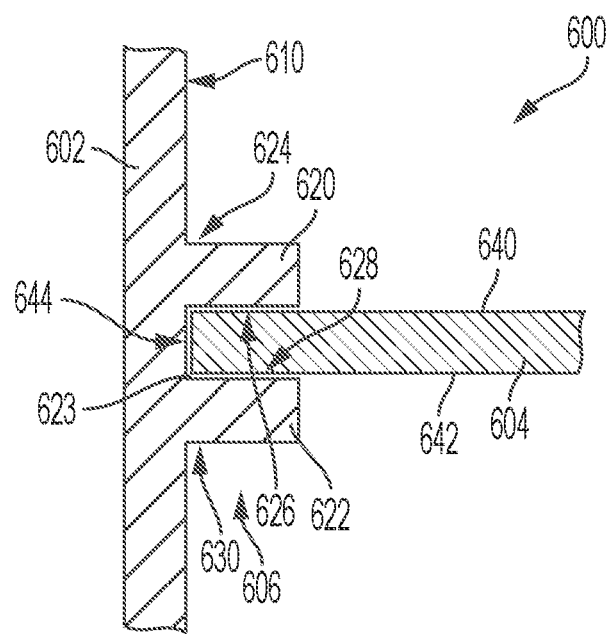
FIG. 6 is a cross-sectional view of a portion of a tank with a first embodiment of a pi joint.

FIG. 6 is a cross-sectional view of a portion of tank 600, which includes wall 602, internal support structure 604, and pi joint 606. Wall 602 has inner surface 610. Pi joint 606 includes first supporting arm 620, second supporting arm 622, and slot 623. First supporting arm 620 has top surface 624 and bottom surface 626. Second supporting arm 622 has top surface 628 and bottom surface 630. Internal support structure 604 has top surface 640, bottom surface 642, and end surface 644.

Tank 600 includes wall 602 and internal support structure 604. Pi joint 606 joins wall 602 and internal support structure 604. Internal support structure 604 may be a baffle (as shown in FIGS. 3A-3B) or a rib (as shown in FIGS. 4A-4B).

Internal support structure 604 extends perpendicularly away from wall 602. In alternate embodiments, internal support structure 604 may extend at an angle less than 90° away from wall 602.

Wall 602 includes inner surface 610. Pi joint 606 includes first supporting arm 620 and second supporting arm 622 that extend away from inner surface 610 of wall 602. First supporting arm 620 and second supporting arm 622 are flanges that extend away from wall 602. Slot 623 is defined between first supporting arm 620 and second supporting arm 622. Slot 623 receives internal support structure 604. First supporting arm 620 includes top surface 624 and bottom surface 626 that is opposite of top surface 624. Second supporting arm 622 includes top surface 628 and bottom surface 630 that is opposite of top surface 624. Internal support structure 604 includes top surface 640, bottom surface 642 that is opposite of top surface 640, and end surface 644 on an end of internal support structure 604. Bottom surface 626 of first supporting arm 620 is adhered to top surface 640 of internal support structure 604, and top surface 628 of second supporting arm 622 is adhered to bottom surface 642 of internal support structure 604. End surface 644 of internal support structure 604 is adhered to inner surface 610 of wall 602. Internal support structure 604 can be adhered to first supporting arm 620, second supporting arm 622, and wall 602 using any suitable adhesive.

Pi joint 606 is integrally woven into wall 602 using any appropriate 3D weaving technique. Pi joint 606 can undergo further processing using liquid molding techniques such as, for example, resin transfer molding or the vacuum assisted process. This allows various pieces of the tank to be constructed as preforms or sub-assemblies and combined or molded together in an advanced stage of the construction of the tank. Pi joint 606 adds strength and support to tank 600. Pi joint 606 provides symmetrical loads to the adhesive area and acts as a double lap-shear joint and increases the surface area for bonding. Additionally, the primary load in the adhesive bonds is located farther away from the area of maximum strain. These factors yield a desirable increase in joint strength.

Figure 7:
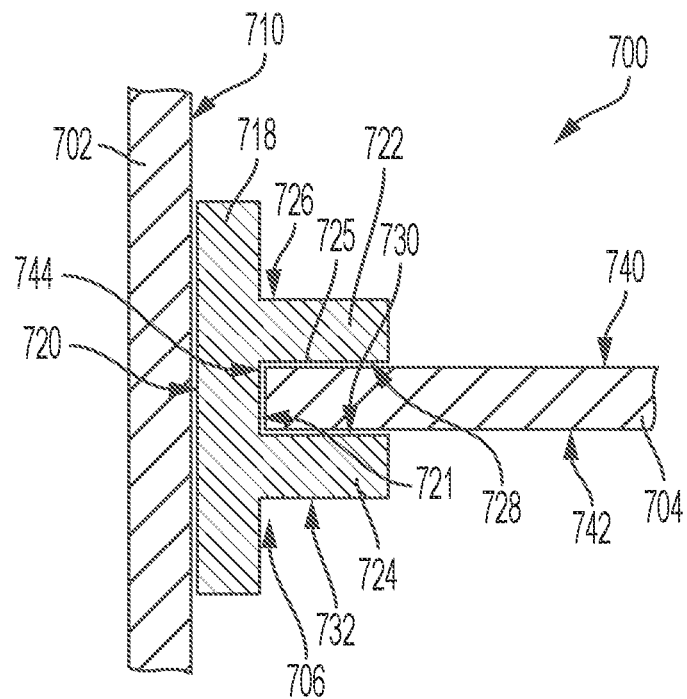
FIG. 7 is a cross-sectional view of a portion of a tank with a second embodiment of a pi joint.

FIG. 7 is a cross-sectional view of a portion of tank 700, which includes wall 702, internal support structure 704, and pi joint 706. Wall 702 has inner surface 710. Pi joint 706 includes base portion 718, anchoring surface 720, base surface 721, first supporting arm 722, second supporting arm 724, and slot 725. First supporting arm 722 has top surface 726 and bottom surface 728. Second supporting arm 724 has top surface 730 and bottom surface 732. Internal support structure 704 has top surface 740, bottom surface 742, and end surface 744.

Tank 700 includes wall 702 and internal support structure 704. Pi joint 706 joins wall 702 and internal support structure 704. Internal support structure 704 may be a baffle (as shown in FIGS. 3A-3B) or a rib (as shown in FIGS. 4A-4B). Internal support structure 704 extends perpendicularly away from wall 702. In alternate embodiments, internal support structure 704 may extend at an angle less than 90° away from wall 702.

Wall 702 includes inner surface 710. Pi joint 706 includes base portion 718 that has anchoring surface 720 and base surface 721. Anchoring surface 720 of base portion 718 can be adhered to inner surface 710 of wall 702 to adhere pi joint 706 to wall 710. Pi joint 706 further includes first supporting arm 722 and second supporting arm 724 that extend away from base portion 718 of pi joint 706. Base surface 721 is positioned between first supporting arm 722 and second supporting arm 724. First supporting arm 722 and second supporting arm 724 are flanges that extend away from base portion 720. Slot 725 is defined between first supporting arm 722 and second supporting arm 724. Slot 725 receives internal support structure 704.

First supporting arm 722 includes top surface 726 and bottom surface 728 that is opposite of top surface 726. Second supporting arm 724 includes top surface 730 and bottom surface 732 that is opposite of top surface 730. Internal support structure 704 includes top surface 740, bottom surface 742 that is opposite of top surface 740, and end surface 744 that is on an end of internal supporting structure 704. Bottom surface 728 of first supporting arm 722 is adhered to top surface 740 of internal support structure 704, and top surface 730 of second supporting arm 724 is adhered to bottom surface 742 of internal support structure 704. End surface 744 of internal supporting structure 704 is adhered to base surface 721 of base portion 718. Internal support structure 704 can be adhered to first supporting arm 722 and second supporting arm 724 using any suitable adhesive.

Pi joint 706 is a 3D woven composite. Pi joint 706 can undergo further processing using liquid molding techniques such as, for example, resin transfer molding or the vacuum assisted process. Pi joint 706 adds strength and support to tank 700. Pi joint 706 provides symmetrical loads to the adhesive area and acts as a double lap-shear joint and increases the surface area for bonding. Additionally, the primary load in the adhesive bonds is located farther away from the area of maximum strain. These factors yield a desirable increase in joint strength.

Figure 8:
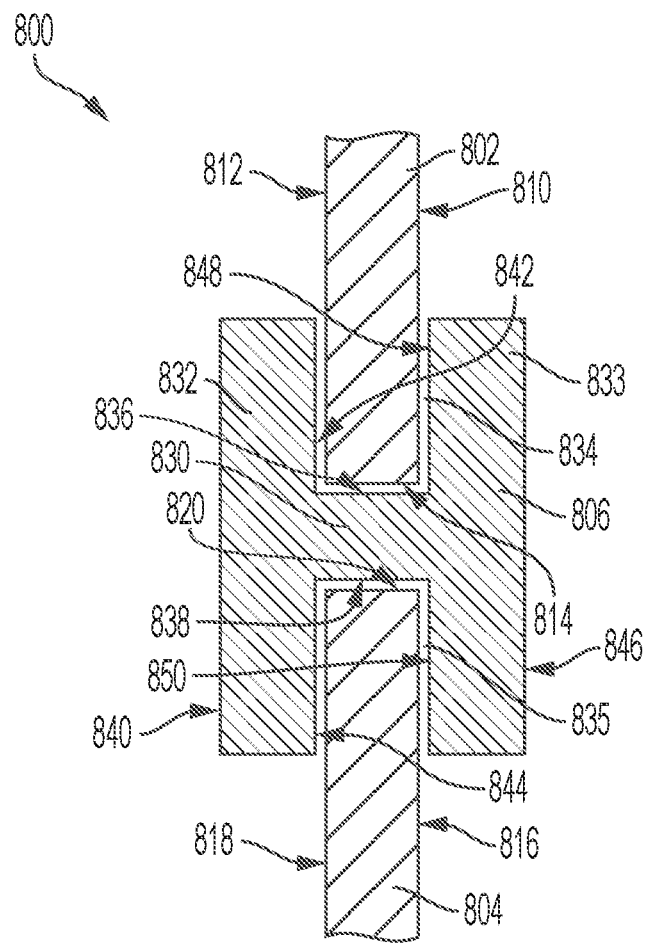
FIG. 8 is a cross-sectional view of a portion of a tank with an H joint.

FIG. 8 is a cross-sectional view of a portion of tank 800, which includes first wall 802, second wall 804, and H joint 806. First wall 802 has inner surface 810, outer surface 812, and end surface 814. Second wall 804 has inner surface 816, outer surface 818, and end surface 820. H joint 802 has base portion 830, first supporting arm 832, second supporting arm 833, slot 834, and slot 835. Base portion 830 has top surface 836 and bottom surface 838. Supporting arm 832 has outer surface 840, top inner surface 842, and bottom inner surface 844. Second supporting arm 833 has outer surface 846, top inner surface 848, and bottom inner surface 850.

Tank 800 includes first wall 802 and second wall 804. H joint 806 joins first wall 802 with second wall 804. First wall 802 includes inner surface 810, outer surface 812 opposite of inner surface 810, and end surface 814 on an end of first wall 802. Second wall 804 includes inner surface 816, outer surface 818 opposite of inner surface 816, and end surface 820 on an end of second wall 804. First wall 802 and second wall 804 extend in the same direction and are positioned so that end surface 814 of first wall 802 faces end surface 820 of second wall 804.

H joint includes base portion 830 with first supporting arm 832 connected to a first end of base portion 820 and second supporting arm 833 connected to a second end of base portion 820. First supporting arm 832 and second supporting arm 833 are flanges that extend away from base portion 820. Slot 834 is defined between first supporting arm 832 and second supporting arm 833 on a top side of H joint 806, and slot 835 is defined between first supporting arm 832 and second supporting arm 833 on a bottom side of H joint 806. Slot 834 receives first wall 802 and slot 835 receives second wall 804. Base portion 820 includes top surface 836 and bottom surface 838 opposite of top surface 836. First supporting arm 832 has outer surface 840, top inner surface 842 opposite of outer surface 840, and bottom inner surface 844 opposite of outer surface 840. Top inner surface 842 is the inner surface of first supporting arm 832 on a top side of base portion 830 and bottom inner surface 844 is the inner surface of first supporting arm 832 on a bottom side of base portion 830. Second supporting arm 833 has outer surface 846, top inner surface 848 opposite of outer surface 846, and bottom inner surface 850 opposite of outer surface 846. Top inner surface 848 is the inner surface of second supporting arm 833 on a top side of base portion 830 and bottom inner surface 850 is the inner surface of second supporting arm 833 on a bottom side of base portion 830.

First wall 802 is positioned to be adhered to H joint 806. Top inner surface 842 of first supporting arm 832 is adhered to outer surface 812 of first wall 802, top inner surface 848 of second supporting arm 833 is adhered to inner surface 810 of first wall 802, and top surface 836 of base portion 830 is adhered to end surface 814 of first wall 802. Second wall 804 is also positioned to be adhered to H joint 806. Bottom inner surface 844 of first supporting arm 832 is adhered to outer surface 818 of second wall 804, bottom inner surface 850 of second supporting arm 833 is adhered to inner surface 816 of second wall 804, and bottom surface 838 of base portion 830 is adhered to end surface 820 of second wall 804.

H joint 806 is a 3D woven composite. H joint 806 can undergo further processing using liquid molding techniques such as, for example, resin transfer molding or the vacuum assisted process. H joint 806 can undergo further processing using liquid molding techniques such as, for example, resin transfer molding or the vacuum assisted process. H joint 806 adds strength and support to tank 800. H joint 806 provides symmetrical loads to the adhesive area and acts as a double lap-shear joint and increases the surface area for bonding. Additionally, the primary load in the adhesive bonds is located farther away from the area of maximum strain. These factors yield a desirable increase in joint strength.

Figure 9:
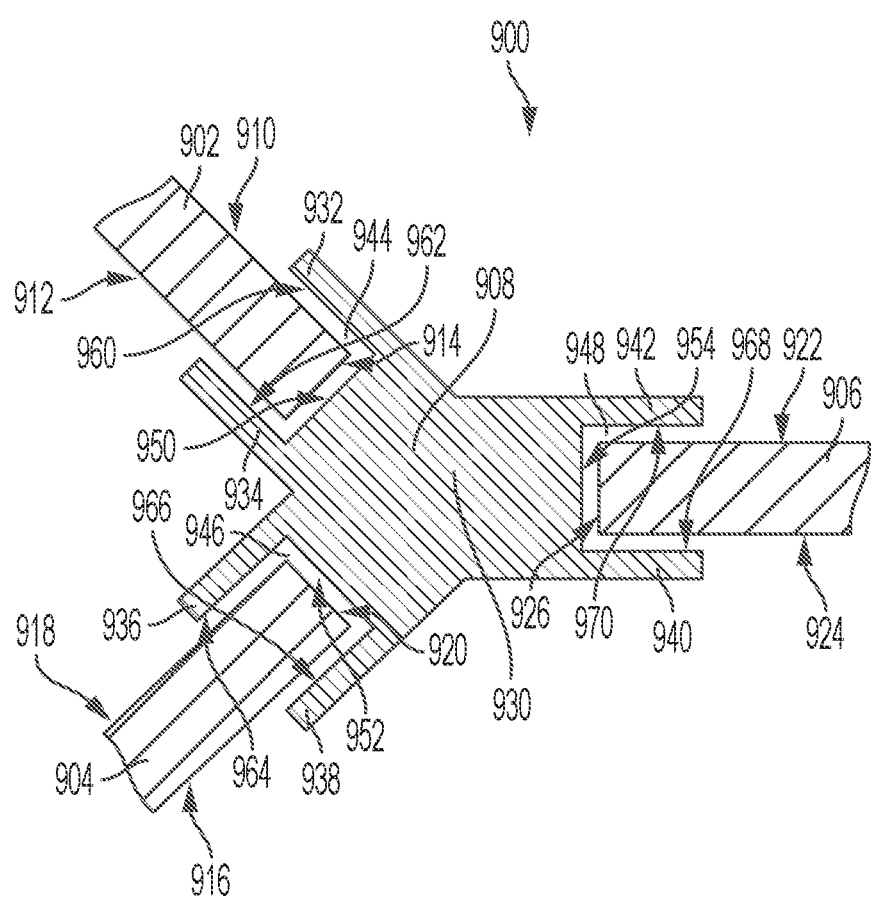
FIG. 9 is a cross-sectional view of a portion of a tank with a Y joint.

FIG. 9 is a cross-sectional view of a portion of tank 900, which includes first wall 902, second wall 904, internal support structure 906, and Y joint 908. First wall 902 has inner surface 910, outer surface 912, and end surface 914. Second wall 904 has inner surface 916, outer surface 918, and end surface 920. Internal support structure 906 has top surface 922, bottom surface 924, and end surface 926. Y joint 908 includes base portion 930, first supporting arms 932, second supporting arm 934, third supporting arm 936, fourth supporting arm 938, fifth supporting arm 940, sixth supporting arm 942, slot 944, slot 946, and slot 948. Base portion 930 has first surface 950, second surface 952, and third surface 954. First supporting arm 932 has inner surface 960. Second supporting arm 934 has inner surface 962. Third supporting arm 936 has inner surface 964. Fourth supporting arm 938 has inner surface 966. Fifth supporting arm has inner surface 968. Sixth supporting arm 942 has inner surface 970.

Tank 900 includes first wall 902, second wall 904, and internal support structure 906. Y joint 908 joins first wall 902, second wall 904, and internal support structure 906. First wall 902 includes inner surface 910, outer surface 912 opposite of inner surface 910, and end surface 914 on an end of first wall 902. Second wall 904 includes inner surface 916, outer surface 918 opposite of inner surface 916, and end surface 920 on an end of second wall 904. Internal support structure 906 includes top surface 922, bottom surface 924 opposite of top surface 922, and end surface 926 on an end of internal support structure. First wall 902, second wall 904, and internal support structure 906 are positioned so that end surface 914 of first wall 902, end surface 920 of second wall 904, and end surface 926 of third wall 906 face one another.

Y joint includes base portion 930 with first supporting arm 932 and second supporting arm 934 connected to a first portion of base portion 930, third supporting arm 936 and fourth supporting arm 938 connected to a second portion of base portion 930, and fifth supporting arm 940 and sixth supporting arm 942 connected to a third portion of base portion 930. First supporting arms 932, second supporting arm 934, third supporting arm 936, fourth supporting arm 938, fifth supporting arm 940, sixth supporting arm 942 are flanges that extend away from base portion 930. Slot 944 is defined between first supporting arm 932 and second supporting arm 934, slot 946 is defined between third supporting arm 936 and further supporting arm 938, and slot 948 is defined between fifth supporting arm 940 and sixth supporting arm 942. Slot 944 receives first wall 902, slot 946 receives second wall 904, and slot 948 receives internal support structure 906. Base portion 930 has first surface 950, second surface 952, and third surface 954. First supporting arm 932 has inner surface 960 that faces inner surface 962 of second supporting arm 934. Third supporting arm 936 has inner surface 964 that faces inner surface 966 of fourth arm 938. Fifth supporting arm has inner surface 968 that faces inner surface 970 of sixth supporting arm 942.

First wall 902 is positioned to be adhered to Y joint 908. Inner surface 960 of first supporting arm 932 is adhered to inner surface 910 of first wall 902, inner surface 962 of second supporting arm 934 is adhered to outer surface 912 of first wall 902, and first surface 950 of base portion 930 is adhered to end surface 914 of first wall 902. Second wall 904 is also positioned to be adhered to Y joint 908. Inner surface 964 of third supporting arm 936 is adhered to outer surface 918 of second wall 904, inner surface 966 of fourth supporting arm 938 is adhered to inner surface 916 of second wall 904, and second surface 952 of base portion 930 is adhered to end surface 920 of second wall 904. Internal support structure 906 is also positioned to be adhered to Y joint 908. Inner surface 968 of fifth supporting arm 940 is adhered to bottom surface 924 of internal support structure 906, inner surface 970 of sixth supporting arm 942 is adhered to top surface 922 of internal support structure 906, and third surface 954 of base portion 930 is adhered to end surface 926 of internal support structure 906.

Y joint 908 is a 3D woven composite. Y joint 908 can undergo further processing using liquid molding techniques such as, for example, resin transfer molding or the vacuum assisted process. Joint structures, for example, Y joint 908, add strength and support to tank 900. Y joint 908 provides symmetrical loads to the adhesive area and acts as a double lap-shear joint and increases the surface area for bonding. Additionally, the primary load in the adhesive bonds is located farther away from the area of maximum strain. These factors yield a desirable increase in joint strength.

Discussion of Possible Embodiments

The following are non-exclusive descriptions of possible embodiments of the present invention.

A conformable tank includes a body with a plurality of walls defining a cavity in the body, and an internal support structure connected to an internal surface of one of the plurality of walls and protruding into the cavity of the body. The plurality of walls are formed of a first 3D woven composite material. The internal support structure is formed of a second composite material.

The conformable tank of the preceding paragraph can optionally include, additionally and/or alternatively, any one or more of the following features, configurations and/or additional components:

Wherein the first 3D woven composite material and the second composite material are selected from the group consisting of fiberglass, carbonaceous materials, synthetic fibers, and combinations thereof.

Wherein the internal support is a baffle that is integrally woven into one of the plurality of walls of the body.

Wherein the internal support is a rib that is integrally woven into one of the plurality of walls of the body.

Wherein a first wall of the plurality of walls and a second wall of the plurality of walls are connected together using an H joint that is made from a 3D woven composite.

Wherein one of the plurality of walls is connected to the internal support structure using a pi joint that is made from a 3D woven composite.

Wherein the pi joint has a first supporting arm and a second supporting arm that are integrally woven into one of the plurality of walls.

Wherein the pi joint has a base portion that is adhered to one of the plurality of walls, and a first supporting arm and a second supporting arm extending outward from the base portion of the pi joint.

Wherein a first wall of the plurality of walls, a second wall of the plurality of walls, and the internal support structure are connected using a Y joint that is made from a 3D woven composite.

Wherein the plurality of walls includes a flat side wall that includes an inner surface and an outer surface; a curved side wall that includes an inner surface and an outer surface; a top wall that includes an inner surface and an outer surface, wherein the top wall extends between and connects the flat side wall and the curved side wall; a bottom wall that includes an inner surface and an outer surface, wherein the bottom wall extends between and connects the flat side wall and the curved side wall; a front wall that includes an inner surface and an outer surface, wherein the front wall contacts and connects the flat side wall, the curved side wall, the top wall, and the bottom wall; and a rear wall that includes an inner surface and an outer surface, wherein the rear wall contacts and connects the flat side wall, the curved side wall, the top wall, and the bottom wall.

Wherein the curved side wall of the conformable tank is configured to conform to an aircraft fuselage.

A potable water system for an aircraft includes a conformable tank positioned adjacent to a fuselage of the aircraft that is configured to hold potable water, a fluid flow inducer connected to the conformable tank the is configured to pump water through the potable water system, and a control valve connected to the fluid flow inducer and the conformable tank that is configured to control the flow of water. The conformable tank includes a body with a plurality of walls defining a cavity in the body, and an internal support structure connected to an internal surface of one of the plurality of walls and protruding into the cavity of the body. The plurality of walls are formed of a first 3D woven composite material. The internal support structure is formed of a second composite material.

The potable water system of the preceding paragraph can optionally include, additionally and/or alternatively, any one or more of the following features, configurations and/or additional components:

Wherein the first composite material and the second composite material are selected from the group consisting of fiberglass, carbonaceous materials, synthetic fibers, and combinations thereof.

Wherein the fluid flow inducer is a hydraulic pump or a compressed air system.

Wherein the internal support is a baffle or a rib that is integrally woven into one of the plurality of walls of the body.

Wherein a first wall of the plurality of walls and a second wall of the plurality of walls are connected together using an H joint that is made from a 3D woven composite.

Wherein one of the plurality of walls is connected to the internal support structure using a pi joint that is made from a 3D woven composite.

Wherein the pi joint has a first supporting arm and a second supporting arm that are integrally woven into one of the plurality of walls.

Wherein the pi joint has a base portion that is adhered to one of the plurality of walls, and a first supporting arm and a second supporting arm extending outward from the base portion of the pi joint.

Wherein a first wall of the plurality of walls, a second wall of the plurality of walls, and the internal support structure are connected using a Y joint that is made from a 3D woven composite.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A conformable tank comprising:
   a body with a plurality of walls defining a cavity in the body, wherein the plurality of walls are formed of a first 3D woven composite material; and
   an internal support structure connected to an internal surface of one of the plurality of walls and protruding into the cavity of the body, wherein the internal support structure is formed of a second composite material;
   wherein one of the plurality of walls is connected to the internal support structure using a pi joint that is made from the first 3D woven composite;
   wherein the pi joint has a first supporting arm and a second supporting arm that are integrally woven into the one of the plurality of walls;
   wherein the internal support structure has a length, the internal support structure further comprising a first and second outermost edge each extending the length of the of the internal support structure, and a width measured between the first and second outermost edge having a widest portion;
   wherein the widest portion of the internal support structure fits between the first supporting arm and the second supporting arm; and
   wherein the plurality of walls further includes:
   a flat side wall that includes an inner surface and an outer surface;
   a curved side wall that includes an inner surface and an outer surface;
   a flat top wall that includes an inner surface and an outer surface, wherein the flat top wall extends between and connects the flat side wall and the curved side wall;
   a bottom wall that includes an inner surface and an outer surface, wherein the bottom wall extends between and connects the flat side wall and the curved side wall;

a front wall that includes an inner surface and an outer surface, wherein the front wall contacts and connects the flat side wall, the curved side wall, the top wall, and the bottom wall; and a rear wall that includes an inner surface and an outer surface, wherein the rear wall contacts and connects the flat side wall, the curved side wall, the top wall, and the bottom wall.

2. The conformable tank of claim 1, wherein the first 3D woven composite material and the second composite material are selected from the group consisting of fiberglass, carbonaceous materials, synthetic fibers, and combinations thereof.

3. The conformable tank of claim 1, wherein the curved side wall of the conformable tank is configured to conform to an aircraft fuselage.

4. A potable water system configured for use in an aircraft, wherein the potable water system comprises:
  a conformable tank configured to be positioned adjacent to a fuselage of the aircraft that is configured to hold potable water, wherein the conformable tank further comprises:
    a body with a plurality of walls defining a cavity in the body, wherein the plurality of walls are formed of a first 3D woven composite material;
    wherein the plurality of walls further includes:
      a flat side wall that includes an inner surface and an outer surface;
      a curved side wall that includes an inner surface and an outer surface;
      a flat top wall that includes an inner surface and an outer surface, wherein the flat top wall extends between and connects the flat side wall and the curved side wall;
      a bottom wall that includes an inner surface and an outer surface, wherein the bottom wall extends between and connects the flat side wall and the curved side wall;
      a front wall that includes an inner surface and an outer surface, wherein the front wall contacts and connects the flat side wall, the curved side wall, the top wall, and the bottom wall; and
      a rear wall that includes an inner surface and an outer surface, wherein the rear wall contacts and connects the flat side wall, the curved side wall, the top wall, and the bottom wall;
    an internal support structure connected to an internal surface of one of the plurality of walls and protruding into the cavity of the body, wherein the internal support structure is formed of a second composite material; and
    a pi joint connecting the internal support structure to one of the plurality of walls, wherein the pi joint has a first supporting arm and a second supporting arm that are integrally woven into one of the plurality of walls;
  wherein the internal support structure has a length, the internal support structure further comprising a first and second outermost edge each extending the length of the of the internal support structure, and a width measured between the first and second outermost edge having a widest portion; and
  wherein the widest portion of the internal support structure fits between the first supporting arm and the second supporting arm;
  a fluid flow inducer connected to the conformable tank and configured to pump water through the potable water system; and
  a control valve connected to the fluid flow inducer and the conformable tank that is configured to control the flow of water.

5. The potable water system of claim 4, wherein the first 3D woven composite material and the second composite material are selected from the group consisting of fiberglass, carbonaceous materials, synthetic fibers, and combinations thereof.

6. The potable water system of claim 4, wherein the fluid flow inducer is a hydraulic pump or a compressed air system.

* * * * *